Oct. 20, 1953  G. E. HENNING  2,655,690
METHOD OF AND APPARATUS FOR CONTINUOUSLY
MAKING VULCANIZED ARTICLES
Filed Aug. 9, 1950
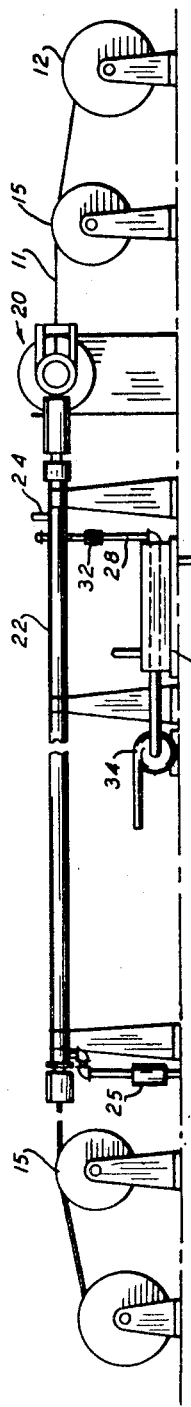
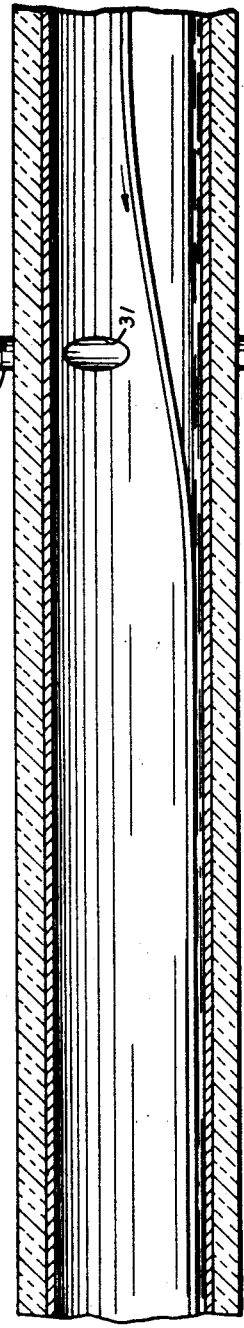
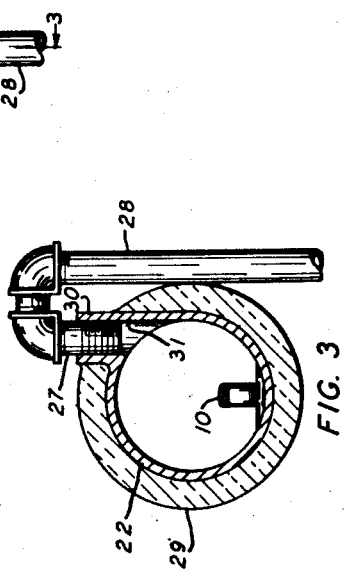
INVENTOR
G. E. HENNING
BY
ATTORNEY Patented Oct. 20, 1953

2,655,690

UNITED STATES PATENT OFFICE 2,655,690

METHOD OF AND APPARATUS FOR CONTINUOUSLY MAKING VULCANIZED ARTICLES

George E. Henning, Baltimore, Md., assignor to Western Electric Company, Incorporated, New York, N. Y., a corporation of New York Application August 9, 1950, Serial No. 178,446

4 Claims. (Cl. 18—6)

1

This invention relates to methods of and apparatus for continuously making vulcanized articles, and particularly to methods of and apparatus for making insulated and jacketed conductors.

In some processes, elongated filamentary articles are continuously covered by extruded vulcanizable compounds, and then the resulting coverings are continuously vulcanized by drawing the covered articles through long vulcanizing tubes into which steam under pressure is introduced. When the article is drawn at a high rate of speed through the vulcanizing tube, the material in the first portion of the tube is soft and plastic, but it is relatively tough in about the remainder of the vulcanizing tube. In order to increase the output of such apparatus, the vulcanizing tubes are sometimes made as long as several hundred feet in order to that the extruded articles may be extruded and advanced at very rapid rates and still be in the vulcanizing tube a sufficient period of time for commercially complete vulcanization.

It has been difficult to extrude and continuously vulcanize a relatively heavy article at a high rate of speed without abrading the extruded article because the article sags due to its weight and slides along the bottom of the vulcanizing tube for the greater part of the length of the vulcanizing tube. As a result, the soft portion thereof sometimes is abraded as it is dragged along the bottom of the vulcanizing tube. Furthermore, such abrasion eventually builds up rough, hard incrustations of the vulcanizable compounds abraded from the articles, which aggravate abrasion and require cleaning of the tube periodically. Sag in the extruded article can be lessened by greater tension upon the portion of the article in the vulcanizing tube, but sufficient tension cannot be placed upon the article to hold it out of contact with the bottom of a vulcanizing tube having a relatively small diameter without stretching the article too greatly. This problem is particularly severe where the extruded article contains no core of high tensile strength. A vulcanizing tube having a size or catenary shape sufficient to prevent contact of the article with the bottom thereof could be provided. However, such a vulcanizing tube would be more expensive in construction than usual cylindrical vulcanizing tubes of relatively small diameter, would require considerably more space than the usual vulcanizing tubes, and would necessitate the consumption of an excessive amount of steam.

An object of the invention is to provide new

2 and improved methods of and apparatus for continuously making vulcanized articles, and particularly to provide methods of and apparatus for making insulated and jacketed conductors.

A further object of the invention is to provide new and improved methods of and apparatus for continuously vulcanizing elongated articles without abrasion of the articles.

A method illustrating certain features of the invention may include advancing a vulcanizable filament through a vulcanizing tube filled with steam under high pressure. A lubricating layer of hot water is maintained on the bottom of the vulcanizing tube to prevent scuffing of the filament due to contact with the tube.

An apparatus illustrating certain features of the invention may include an elongated vulcanizing tube, means for advancing a filament composed at least partially of a vulcanizable compound through the vulcanizing tube, whereby the filament sags into contact with the tube starting at a point between the ends thereof, means for introducing steam into the vulcanizing tube to vulcanize the vulcanizable portion of the filament, and means for providing water along the bottom portion of the vulcanizing tube to lubricate it.

A complete understanding of the invention may be obtained from the following detailed description of a method and an apparatus forming specific embodiments thereof, when read in conjunction with the appended drawings, in which:

Fig. 1 is a fragmentary, side elevation of an apparatus forming one embodiment of the invention, Fig. 2 is an enlarged, fragmentary, vertical section of the apparatus, and Fig. 3 is a vertical section taken along line 3—3 of Fig. 2.

Referring now in detail to the drawings, there is shown therein a continuous extruding and vulcanizing machine for forming and vulcanizing a protective covering 10 (Fig. 3) composed of a vulcanizable compound on a conductive core 11 (Fig. 1) to form a covered conductor. The vulcanizable compound of which the covering 10 is composed may contain one or more of such materials as rubber, a copolymer of butadiene and styrene (GR–S), and polymerized chloroprene (neoprene) as the essential vulcanizable constituent thereof.

In forming the covering on the conductive core, the core is advanced continuously from a supply reel 12 by a capstan 15. As the conductive core 11 is drawn from the supply reel 12, it passes through an extruder 20, which extrudes thereon the covering of a vulcanizable compound, such as a rubber compound, a polymerized chloroprene compound or a compound including copolymeric butadiene and styrene. The covered conductor is advanced from the extruder 20 into an elongated, steam-jacketed vulcanizing tube 22 having an inlet pipe 24 through which steam under a high pressure, such as, for example, a pressure of around 250 pounds per square inch, is supplied to the tube 22. A steam trap 25 is connected to the bottom portion of the vulcanizing tube for withdrawing liquids from the tube. The steam supplied to the vulcanizing tube 22 by the inlet pipe 24, is very hot, and is under a high pressure so that it heats the extruded covering 10 and vulcanizes it.

Water at a temperature almost as high as and a pressure as high as those of the steam is introduced into the vulcanizing tube 22 through a pipe 27 from a pipe line 28 leading from a source of high pressure, high temperature water. A steam jacket 29 keeps the water at a temperature almost as high but slightly less than that of the steam in the vulcanizing tube. The pipe 27 is mounted in a socket 30 mounted in alignment with a bore 31 formed substantially tangentially in the vulcanizing tube near the entrance end, thereof. An adjustable needle valve 32 in the pipe line 28 controls the flow of the water. The water is placed under a pressure slightly greater than that of the steam by a pump 34. The water flows along the bottom of the vulcanizing tube, and leaves the vulcanizing tube through a steam trap 25. The flow is just sufficient to form a lubricating layer on the bottom of the tube, and the covered conductor sags into contact with this layer of water, which prevents scuffing the covering, thereby preventing incrustations on the bottom of the tube. However, the layer of water is sufficiently shallow to insure that most of the periphery of the covering is in direct contact with the steam in the vulcanizing tube. The vulcanizing tube is level and the moving covered conductor draws the water toward the steam trap.

*Operation*

The conductive core 11 is advanced continuously through the extruder 20, which forms the covering 10 thereover. The covered conductor is advanced continuously through the vulcanizing tube 22 at a high rate of speed, for example, about 700 feet per minute, and sags into contact with the lubricating layer of water maintained by the pipe 27 along the intermediate portion of the vulcanizing tube. The layer of water prevents abrasion of the covering by the vulcanizing tube, and the water flows along the bottom of the vulcanizing tube to the steam trap 25 due to the drag thereon of the covered conductor. This keeps the water from accumulating in the vulcanizing tube beyond the depth necessary for lubricating the conductor. The steam trap 25 permits the water and steam condensate to flow therethrough at a rate sufficient to prevent backing up of the water in the vulcanizing tube.

The above-described method and apparatus form unscuffed covered conductors, prevent formation of hard incrustations from the abrasions, and are simple and inexpensive in the use thereof.

What is claimed is:

1. The method of making vulcanized articles, which comprises advancing a vulcanizable filament through an elongated, generally horizontal vulcanizing tube containing steam under high pressure, whereby the filament sags into contact with the tube, and introducing hot water into the vulcanizing tube at a point in advance of that where the filament first engages the bottom of the vulcanizing tube, whereby the water acts as a cushion to prevent scuffing of the filament due to contact with the tube.

2. The method of making covered conductors, which comprises advancing a conductive core continuously through an extruder and a horizontally extending tube of such length that a covered core advancing therethrough sags and contacts a portion of the bottom of the tube, continuously forming a covering of a soft, vulcanizable compound around the core in the extruder, introducing steam into the tube under a high pressure to vulcanize the covering, and introducing hot water continuously from an external supply thereof into the vulcanizing tube under a high pressure and in sufficient volume to cause it to flow in a shallow stream along that portion of the tube contacted by the covered core and to provide a cushion which prevents scuffing of the covering on the core.

3. An apparatus for continuously covering conductors, which comprises an extruder for forming a covering of a vulcanizable compound around a conductive core, an elongated vulcanizing tube, means for advancing a covered conductor from the extruder into and through the vulcanizing tube in such a manner that the covered conductor sags into contact with the tube starting at a point between the ends thereof, means for introducing steam under a high pressure into the vulcanizing tube to vulcanize the covering, flow-directing means positioned near the entrance end of the vulcanizing tube for directing water tangentially into the vulcanizing tube near the enrance end thereof, means for forcing hot water under a pressure at least as great as that of the steam through the flow-directing means, and means for regulating the flow of water to the vulcanizing tube.

4. An apparatus for continuously covering conductors, which comprises an extruder for forming a covering of a vulcanizable compound around a conductive core, an elongated vulcanizing tube, means for advancing a covered conductor from the extruder into and through the vulcanizing tube, said vulcanizing tube being of such length that a covered conductor advanced therethrough sags into contact with the bottom of the tube starting at a point between the ends thereof, means for introducing steam into the vulcanizing tube to vulcanize the covering, an inlet positioned between the entrance end of the vulcanizing tube and the point where the covered conductor first contacts the tube, an external supply of hot water, and means for introducing hot water from the supply under pressure through the inlet into the vulcanizing tube whereby the water flows along that portion of the bottom of the vulcanizing tube contacted by the covered conductor to provide a lubricating layer therealong which prevents scuffing of the covering on the conductor.

GEORGE E. HENNING.

References Cited in the file of this patent

UNITED STATES PATENTS

| Number | Name | Date |
|---|---|---|
| 2,069,087 | Forstrom et al. | Jan. 26, 1937 |
| 2,291,344 | Powell | July 28, 1942 |
| 2,561,820 | Ramsey et al. | July 24, 1951 |